United States Patent [19]

Schnizler

[11] Patent Number: 5,493,930
[45] Date of Patent: Feb. 27, 1996

[54] TOOTHED GEARWHEEL WITH CENTRIFUGAL FORCE LUBRICATION

[75] Inventor: Albrecht Schnizler, Nürtingen, Germany

[73] Assignee: Metabowerke GmbH & Co., Nurtingen, Germany

[21] Appl. No.: 346,419

[22] Filed: Nov. 29, 1994

[30] Foreign Application Priority Data

Nov. 29, 1993 [DE] Germany .......................... 43 40 527.4

[51] Int. Cl.⁶ .................................................. F16H 57/04
[52] U.S. Cl. .................................................................. 74/468
[58] Field of Search ............................... 74/468; 184/6.12

[56] References Cited

U.S. PATENT DOCUMENTS 1,979,007  10/1934  Morton ........................ 74/468

FOREIGN PATENT DOCUMENTS 4112843  10/1992  Germany ...................... 74/468
4113064   4/1992  Japan .......................... 74/468
1693313  11/1991  U.S.S.R. ...................... 74/468

*Primary Examiner*—Allan D. Herrmann
*Assistant Examiner*—Sherry Estremsky
*Attorney, Agent, or Firm*—Charles E. Baxley

[57] ABSTRACT

A gearwheel has a coaxial trough which is closed by a first lid to form an inner storage chamber for grease and is also closed by a second lid to form an outer storage chamber. The circumferential surfaces of the first and second lids sealingly adjoin the outer wall of the coaxial trough and each of the lids has a narrow groove for controlled metering of the grease.

14 Claims, 3 Drawing Sheets

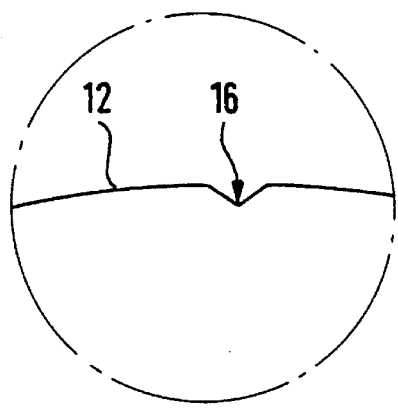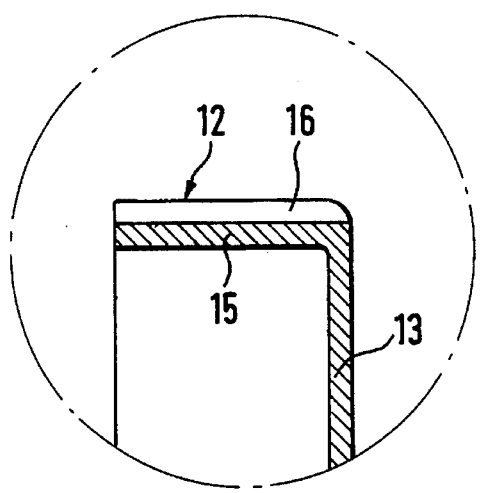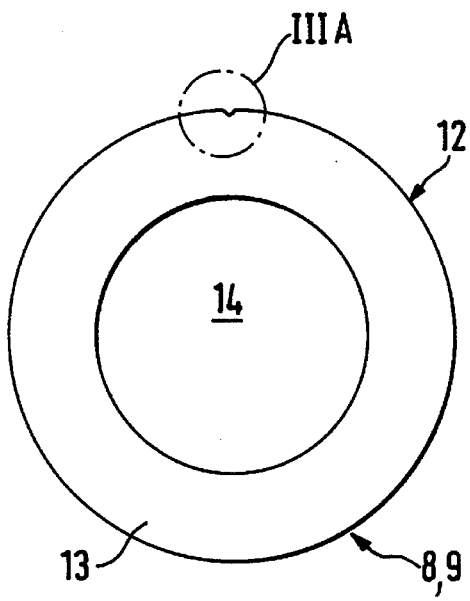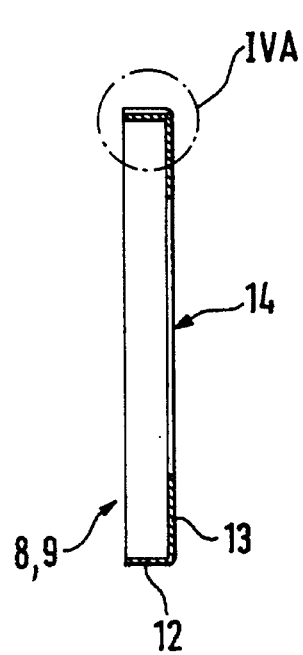

TOOTHED GEARWHEEL WITH CENTRIFUGAL FORCE LUBRICATION

FIELD OF THE INVENTION

The present invention relates to a toothed gearwheel with centrifugal force lubrication.

BACKGROUND OF THE INVENTION

The invention is concerned particularly with toothed gearing for the reduction of high speed drive motors, and more particularly concerned with electric tools, where at least one gearwheel meshes with a counter wheel or pinion and has a spur gear on or near its outer circumference. Gearwheels of this kind often include a coaxial trough for storage of grease.

A toothed gear of this kind is known from German Patent DE 41 12 843. There the coaxial trough of the gearwheel encloses a single storage chamber for the grease, and a lid of the trough is formed by a disc-like cover which adjoins a side of the gearwheel towards which the trough opens. In a contact area between this cover and a corresponding bearing face of the gearwheel there is one or more radially outwardly directed leakage path which can be formed by a hair gap between the contact bearing face of the gearwheel and the cover. During rotation of the gearwheel the grease located in the single storage chamber migrates as a result of centrifugal action towards the radial outlet gap and passes from there without further obstruction to lubricating points on the spur gear.

In practice with known toothed gearing grease in the storage chamber is used up too quickly. The lubricating action occurs even when the gearing is new and still has adequate lubrication as a result of lubricant which is applied directly to the spur gears of the gearwheels during its manufacture.

OBJECTS AND SUMMARY OF THE INVENTION

It is an object of the present invention to provide a toothed gearwheel with centrifugal lubrication in which an amount of grease emerging from a storage chamber can be metered closely and only emerges after a certain running time has elapsed.

In accordance with the present invention, there is provided a toothed gearwheel having a spur gear on or near its outer circumference. The toothed gearwheel has a coaxial trough open at an end face to form a storage chamber for grease. The trough is closed by a lid which includes a leakage path extending up to the spur gear of the gearwheel. The trough, in succession in the axial direction, has an inner storage chamber filled with grease, and an outer storage chamber wherein the inner storage chamber is separated from the outer storage chamber by an inner lid and the outer storage chamber is separated from the outside by an outer lid. The two lids each have a circumferential surface which fits tightly against the radially outer internal wall of the trough. A narrow groove extends from the storage chambers over these circumferential surfaces of the two lids.

In the new or starting state of the toothed gear, the lubricant is located only in the inner storage chamber. The lubricant is at first moved into the outer storage chamber in a measured amount by means of centrifugal force and from there the lubricant passes out through the leakage paths to the lubricating points after further metering. The fine metering is produced through the calibration of the narrow grooves on the circumferential faces of the lids closing the two storage chambers. The time delay for the grease to reach the lubricating points is produced by the temporary storage of the grease in the outer storage chamber.

Variation of the length of time required for the grease to travel from the inner storage chamber to the lubricating points, or gear teeth, can be achieved by varying the alignment of the openings of the inner lid and the outer lid. The shortest travel time is achieved by aligning the openings of the grooves. The longest travel time is achieved by staggering the openings of the grooves by an angle up to 180 degrees.

The path of the grooves over the circumferential faces of the two lids from each inside to each outside can have an effect on the metered amount and outlet speed of the grease. Thus the grooves can be inclined to the circumferential faces of the two lids opposite to or in the direction of rotation of the gearwheel. In a preferred embodiment the grooves run axially parallel over the circumferential faces of the two lids.

The inner and outer lids are formed as pot-shaped drawn sheet steel members, thereby providing a sufficiently wide circumferential face which provides close contact against the inner wall of the trough of the gearwheel and provides an adequate length for the grooves.

DESCRIPTION OF THE DRAWINGS

Other important objects and advantages of the invention will be apparent from the detailed description which follows, taken in connection with accompanying drawings in which:

FIG. 3 is a plan view of one of the lids for closing the storage chamber of the gear wheel of FIG. 1;

FIG. 3A is an enlarged view of the portion of the circumferential side of the lid of FIG. 3 which is enclosed in a circle marked IIIA;

FIG. 4 is a cross-sectional view of the lid of FIG. 3;

FIG. 4A is an enlarged view of the portion of the circumferential side of the lid of FIG. 4 which is enclosed in a circle marked IVA.

DETAILED DESCRIPTION OF THE INVENTION

Figure 1:
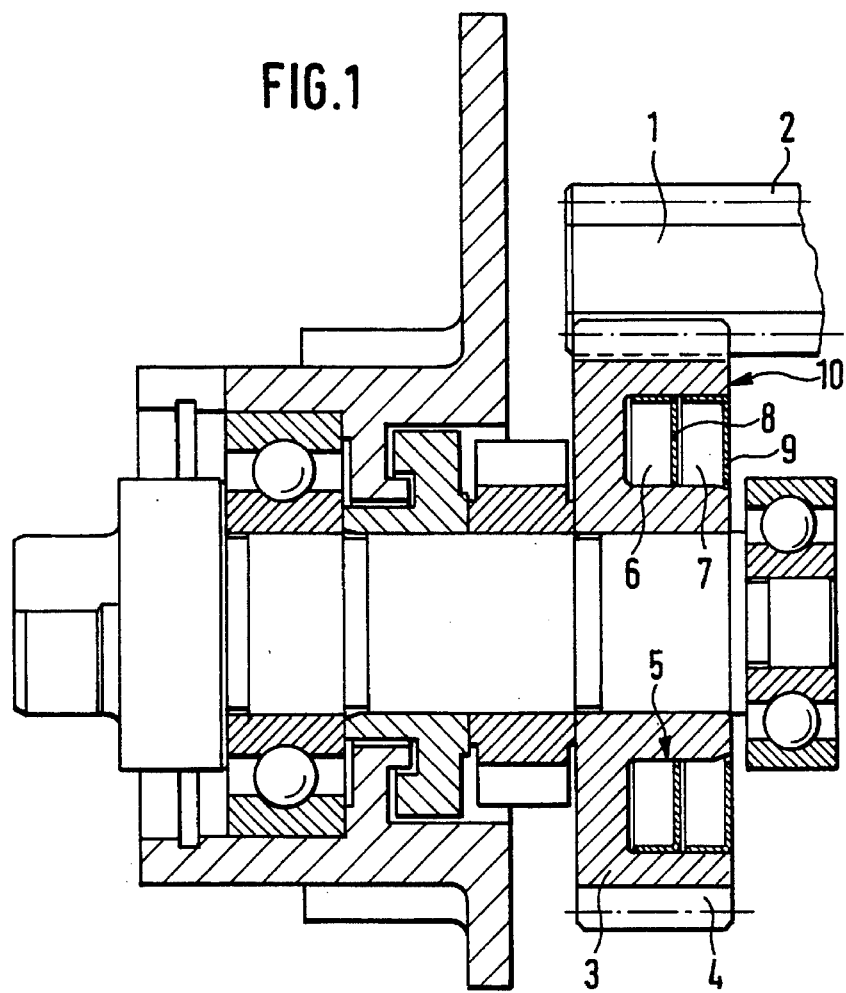
FIG. 1 is a cross-sectional view of a toothed gear wheel with centrifugal force lubrication, made in accordance with the present invention, with the gearwheel shown incorporated in a drilling machine.

With reference to the drawings, wherein like reference numerals designate like or corresponding parts throughout, there is shown in FIG. 1 a pinion 1 which is seated on an engine output shaft (not shown). The pinion 1 meshes through its outer teeth 2 with the teeth 4 on the circumference of a spur gear wheel 3, which is made in accordance with the present invention. The gearwheel 3 is seated on an output shaft which is not further described.

Figure 2:
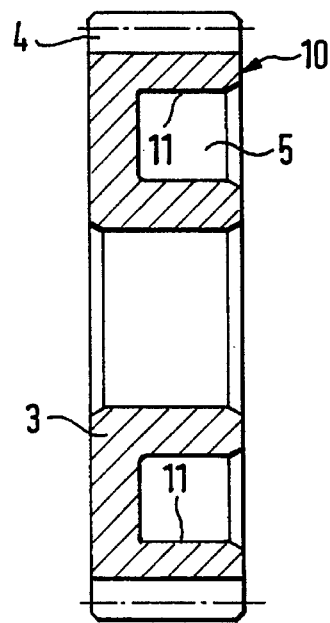
FIG. 2 is a cross-sectional view of the gearwheel of FIG. 1 with the gearwheel shown removed from the drilling machine.

The spur gearwheel 3 is shown in FIG. 2 and has a ring groove cut from one of the two end sides with cylindrical inner and outer flanks forming a trough 5 which, as can be seen in more detail in FIG. 1, houses an inner storage chamber 6 and outer storage chamber 7. The inner storage chamber 6 is divided from the outer storage chamber 7 by an inner lid 8 and the outer storage chamber 7 is closed from the outside by an outer lid 9 which is identical with the inner lid 8. In the starting or new state of the gearing the inner storage chamber 6 is filled with grease during manufacture which, as a result of the effects of centrifugal force, migrates from there in the manner to be explained in detail below, into the outer storage chamber 7 from where it then passes through a leakage path 10 at one end side of the spur wheel 3 up to the lubricating points in the area of the intermeshing teeth 2 and 4.

FIGS. 3 and 4 show details of the lids 8 and 9 which are used to close storage chambers 6 and 7. The lids 8 and 9 are formed as drawn pot-shaped sheet steel parts which have an end disc 13 with central opening 14 and a cylindrical pot wall 15 angled at right angles therefrom. The pot wall 15 thus also has a cylindrical circumferential face 12 which, when the lids 8 and 9 are inserted into trough 5, sealingly adjoins the cylindrical wall 11 of trough 5.

As can best be seen from the enlarged illustrations of FIGS. 3A and 4A, a narrow groove 16 extends axially parallel over the circumferential face 12 on the outside of the pot wall 15. This groove 16 can also have the shape of a notch or channel which serves for the passage of the grease from the inner storage chamber 6 to the outer storage chamber 7 and from there to the outside. Metering of the grease which is forced through as a result of centrifugal force can only be carried out over the passage cross-section of these grooves 16 on the circumferential faces 12 of the two lids 8 and 9. Since each of the lids 8 and 9 preferably has only one single groove 16 on its circumferential face 12, it is still additionally possible by rotating the lid 8 which closes the inner storage chamber 6 in relation to the lid 9 which closes the outer storage chamber 7 from the outside, to shorten or lengthen the leakage path for the grease through the outer storage chamber 7, depending on whether the grooves 16 on the circumferential faces 12 of the two lids 8 and 9 align axially with each other or are off-set more or less from each other, as viewed in the circumferential direction of the trough 5. The longest leakage path through the outer storage chamber 7 can be achieved if the stagger or angular relationship between the grooves 16 of the inner lid 8 and outer lid 9 is in the order of 180 degrees.

Figure 5:
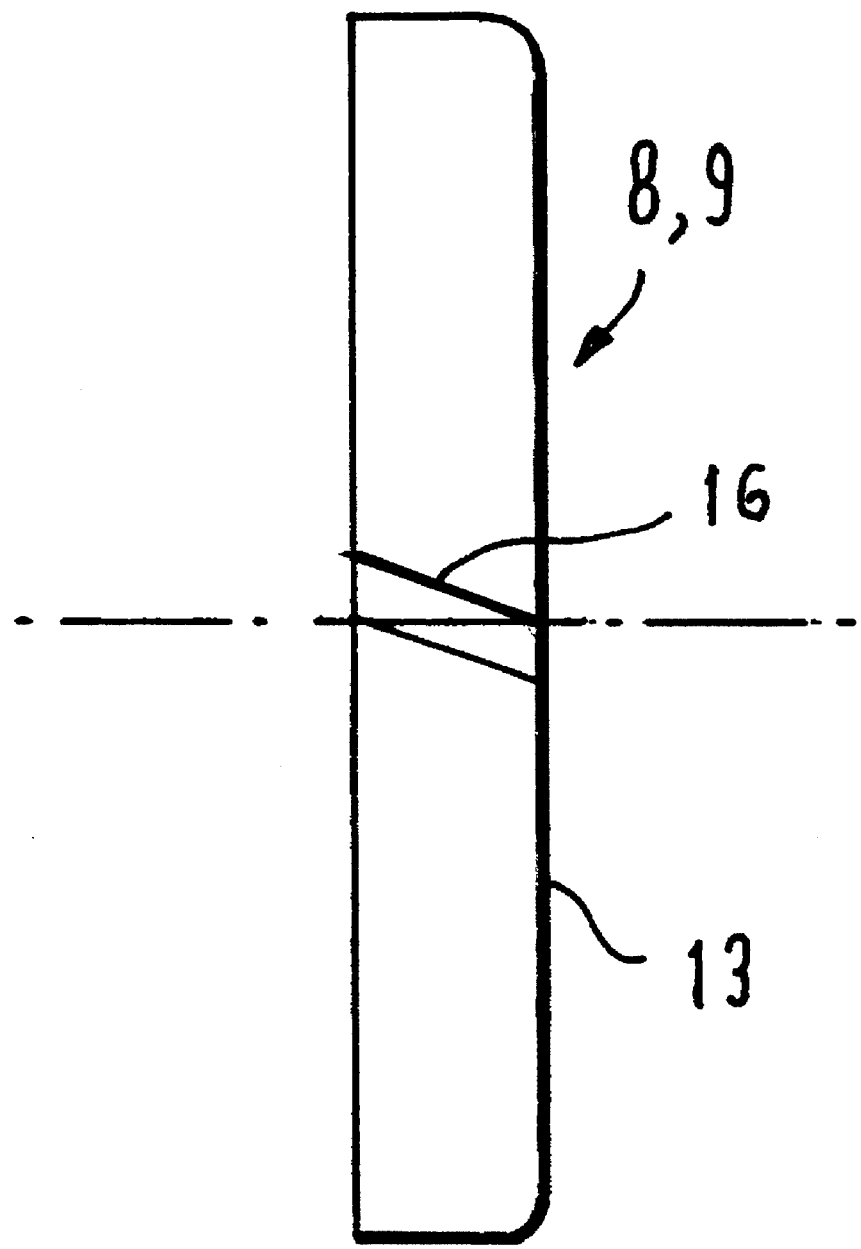
FIG. 5 is a top view of an alternative embodiment of the invention which incorporates an inclined groove.

In an alternative embodiment of the invention which is shown in FIG. 5, the groove 20 can be inclined relative to the disk portion 13 of the lids 8 and 9. The inclination of the groove 20 may be in the direction of rotation of the gearwheel 3 or, alternatively, the inclination of the groove 20 may be opposite the rotation of the gear wheel 3.

The foregoing specific embodiments of the present invention as set forth in the specification herein are for illustrative purposes only. Various changes and modifications may be made within the spirit and scope of this invention.

I claim:

1. A toothed gearwheel comprising:
   a cylindrical disk having an axis, a first face, a second face and a peripheral surface with a plurality of gearteeth formed on said peripheral surface;
   a coaxial trough formed in said first face, with said trough having an intermediate portion and an outer portion;
   a first lid member disposed in said intermediate portion of said trough and closing a portion of said trough to form an inner storage chamber;
   a second lid member disposed in said outer portion of said trough and closing said outer portion of said trough to form an outer storage chamber;
   a first groove portion formed in said first lid member with said first groove portion communicating between said inner storage chamber and said outer storage chamber;
   a second groove portion formed in said second lid member, with said second groove portion communicating between said outer storage chamber and said first face of said disk, and wherein said first groove portion and said second groove portion each have an outlet opening, and wherein said first lid member and said second lid member each fit tightly in said coaxial trough.

2. A toothed gearwheel as claimed in claim 1, wherein said outlet opening of said first groove portion is in substantial axial alignment with said outlet opening of said second groove portion.

3. A toothed gearwheel as claimed in claim 1, wherein said outlet opening of said first groove portion is offset by an angle from said outlet opening of said second groove portion.

4. A toothed gearwheel as claimed in claim 3, wherein said angular offset between said outlet opening of said first groove portion and said second groove portion is in the order of 180 degrees.

5. A toothed gearwheel as claimed in claim 1, wherein said first groove portion and said second groove portion are each axially disposed.

6. A toothed gearwheel as claimed in claim 5, wherein said first groove portion and said second groove portion are substantially parallel.

7. A toothed gearwheel as claimed in claim 6, in which said coaxial trough comprises a cylindrical groove.

8. A toothed gearwheel as claimed in claim 1, wherein each of said lid members is pot-shaped and each of said lid members has an outer surface with said groove portions disposed on said outer surfaces.

9. A toothed gearwheel as claimed in claim 8, in which each of said lid members comprises a drawn sheet metal member.

10. A toothed gearwheel according to claim 1, wherein said first lid member and said second lid member are identical.

11. A toothed gearwheel as claimed in claim 1, wherein said first groove portion and said second groove portion are inclined relative to said axis.

12. A toothed gearwheel as claimed in claim 1, wherein said gearwheel has a defined direction of rotation and wherein at least one of said groove portions is inclined in a direction toward said defined direction of rotation.

13. A toothed gearwheel as claimed in claim 1, wherein said gearwheel has a defined direction of rotation and wherein at least one of said groove portions is inclined in a direction opposite said defined direction of rotation.

14. A toothed gearwheel as claimed in claim 1, wherein said lid members each comprise a disk portion and a lip portion with said lip portion disposed substantially perpendicular to said disk portion.

* * * * *